(12) United States Patent
Vander Lind et al.

(10) Patent No.: US 10,577,111 B2
(45) Date of Patent: Mar. 3, 2020

(54) BIMODAL PARACHUTE DEPLOYMENT SYSTEM

(71) Applicant: Kitty Hawk Corporation, Mountain View, CA (US)

(72) Inventors: Damon Vander Lind, Oakland, CA (US); Cameron Robertson, San Mateo, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 513 days.

(21) Appl. No.: 15/338,086

(22) Filed: Oct. 28, 2016

(65) Prior Publication Data

US 2018/0118353 A1  May 3, 2018

(51) Int. Cl.
*B64D 17/34* (2006.01)
*B64D 17/54* (2006.01)
*B64D 17/38* (2006.01)
*B64D 17/62* (2006.01)
*B64D 17/80* (2006.01)

(52) U.S. Cl.
CPC .......... *B64D 17/54* (2013.01); *B64D 17/343* (2013.01); *B64D 17/386* (2013.01); *B64D 17/62* (2013.01); *B64D 17/80* (2013.01)

(58) Field of Classification Search
CPC ........ B64D 17/54; B64D 17/62; B64D 17/80; B64D 17/343; B64D 17/386
See application file for complete search history.

(56) References Cited

U.S. PATENT DOCUMENTS

| | | | |
|---|---|---|---|
| 5,890,678 A * | 4/1999 | Butler, Jr. | B64D 17/08 244/152 |
| 5,899,414 A | 5/1999 | Duffoo | |
| 6,338,457 B1 * | 1/2002 | Hilliard | B64D 17/80 244/137.4 |
| 6,685,140 B2 | 2/2004 | Carroll | |
| 7,523,891 B2 * | 4/2009 | Hakki | B64D 17/80 244/139 |
| 8,191,831 B2 | 6/2012 | Nadir | |
| 2002/0070315 A1 * | 6/2002 | Hilliard | B64D 17/025 244/139 |
| 2003/0025038 A1 * | 2/2003 | Nicolai | B64C 39/024 244/152 |
| 2007/0252042 A1 * | 11/2007 | Smith | B64D 17/343 244/149 |
| 2008/0099623 A1 * | 5/2008 | Lee | B64D 17/343 244/145 |
| 2009/0308979 A1 * | 12/2009 | Nadir | B64C 39/024 244/147 |
| 2016/0009392 A1 | 1/2016 | Korhonen et al. | |
| 2016/0318615 A1 * | 11/2016 | Pick | B64C 39/024 |
| 2017/0050735 A1 * | 2/2017 | Lin | B64D 17/62 |

* cited by examiner

*Primary Examiner* — Philip J Bonzell
*Assistant Examiner* — Tye William Abell
(74) *Attorney, Agent, or Firm* — Van Pelt, Yi & James LLP

(57) ABSTRACT

A parachute deployment system is disclosed. In various embodiments, the system includes an interface configured to receive sensor information; a parachute load limiting device; and a parachute load limiting device state controller. The parachute load limiting device state controller sets a state of the parachute load limiting device to a state associated with a corresponding amount of load based at least in part on the sensor information.

24 Claims, 8 Drawing Sheets

BIMODAL PARACHUTE DEPLOYMENT SYSTEM

BACKGROUND OF THE INVENTION

Parachutes are used to recover aircrafts in times of emergency. Conditions during the time of emergency can vary drastically. Different types of parachutes may be suited for different conditions. Weight limitations may prevent an aircraft from being outfitted with multiple varying parachutes.

BRIEF DESCRIPTION OF THE DRAWINGS

Various embodiments of the invention are disclosed in the following detailed description and the accompanying drawings.

DETAILED DESCRIPTION

Figure 1:
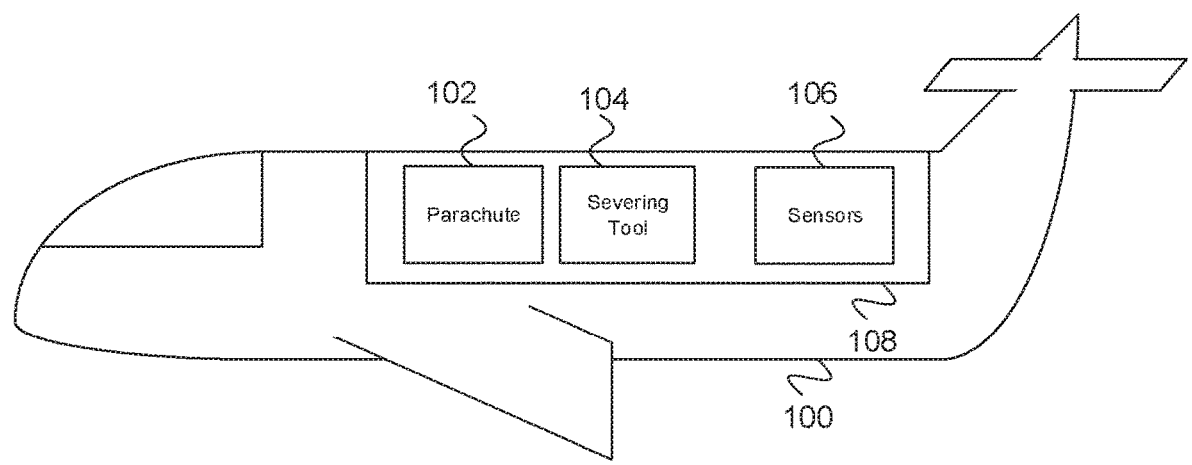
FIG. 1 is a diagram illustrating an embodiment of an aircraft comprising a bimodal parachute deployment system before deployment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A bimodal parachute deployment system is disclosed. The system comprises an interface configured to receive sensor information, a parachute load limiting device, and a parachute load limiting device state controller. The parachute load limiting device state controller sets a state of the parachute load limiting device to a state associated with a corresponding amount of load based at least in part on the sensor information. In some embodiments, the parachute load limiting device has multiple states that correspond to varying amounts of load. For example, an engaged state may be a state wherein the parachute load limiting device constrains the load of the parachute to a predetermined limit. A disengaged state may be a state wherein the parachute load limiting device does not affect the parachute's load.

Various conditions may require various types of parachutes in order to recover an object or aircraft. For example, an aircraft dropping at a high speed and high altitude may require a small parachute to ensure the parachute does not rip upon deployment whereas a large parachute may be appropriate in the event the aircraft is falling from a low altitude. The bimodal parachute deployment system may cause an appropriate parachute to be deployed based on present conditions.

In some embodiments, the parachute load limiting device decreases a load a parachute experiences upon initial deployment. For example, the parachute load limiting device may initially constrain the ability of the parachute to fully open. The load limiting device may increase the ability of a tether of the parachute to absorb shock, decreasing the load on the parachute. The parachute may be used to recover an object, such as an aircraft. In some embodiments, the parachute load limiting device state controller engages or disengages the parachute load limiting device based on an altitude, speed, or flight trajectory of the object to be recovered. The object or aircraft may comprise sensors that gather information regarding altitude, speed, wind speed, flight trajectory, environmental factors, obstacles or any other appropriate factor.

FIG. 1 is a diagram illustrating an embodiment of an aircraft comprising a bimodal parachute deployment system before deployment. The bimodal parachute deployment system may be stored on aircraft 100 to be used in the event of an emergency. For example, the system may be triggered when the aircraft has a fatal engine failure. In the example shown, aircraft 100 comprises bimodal parachute deployment system 108. Bimodal parachute deployment system 108 comprises parachute 102, severing tool 104, and sensors 106. Parachute 102 may be stored in a container prior to deployment, such as a sack or a bucket. Parachute 102 may be folded and secured with ties. Parachute load limiters may be stored alongside the parachute or as part of the parachute. Various parachute load limiters may be used, such as reefing devices, shock absorbers, or any other appropriate load limiting device.

Severing tool 104 may be stored near parachute 102. In some embodiments, severing tool 104 is the parachute load limiting device state controller. Severing tool 104 may be used to modify parachute 102 during or prior to deployment. In various embodiments, various parachute load limiting device state controllers are used. The type of parachute load limiting device state controller used may be based upon a shape, a configuration, a material, an appropriate factor of the parachute load limiting device, or requirements of the flight vehicle.

Sensors 106 may include sensors attached to aircraft 100 at multiple points on the aircraft. Sensors 106 may comprise an accelerometer, a gyroscope, a thermometer, a camera, sonar, radar, a camera, or any other appropriate sensor. Sensors 106 may be used to gather information regarding aircraft 100's position and flight trajectory. They may be used to gather information on surroundings of the aircraft and environmental obstacles.

Figure 2A:
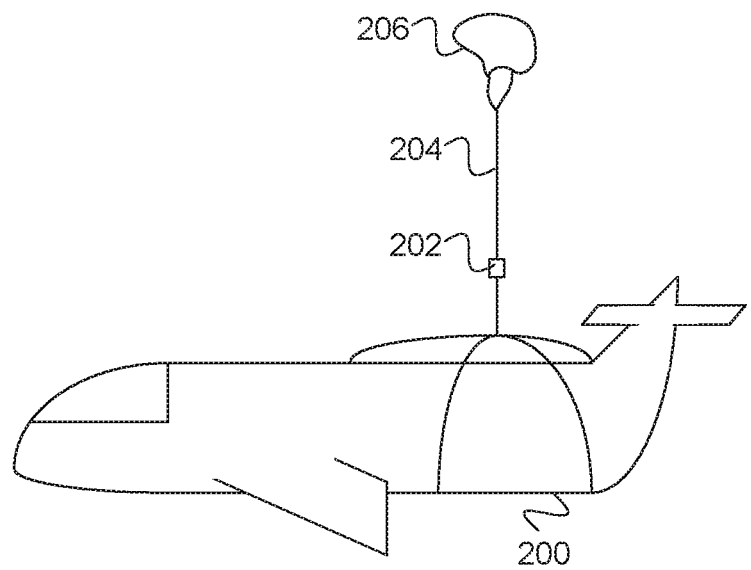
FIG. 2A is a diagram illustrating an embodiment of an aircraft comprising a load limiting device of a bimodal parachute deployment system before the load limiting device is triggered.

FIG. 2A is a diagram illustrating an embodiment of an aircraft comprising a load limiting device of a bimodal parachute deployment system before the load limiting device is triggered. The load limiting device may expand in one dimension in the event pressure exerted upon the device in the dimension reaches a predetermined threshold. In the example shown, shock absorber 202 is used as a load limiting device. Parachute 206 has been deployed. Parachute 206 is attached to shock absorber 202 via tether 204 at a topmost side of shock absorber 202. Tether 204 continues from below shock absorber 202 to split off into a bridle that attaches to aircraft 200 at multiple points on the aircraft. Shock absorber 202 may be positioned between two separate sections of tether. In the example shown, parachute 206 is in initial stages of deployment. Parachute 206 may not be fully filled with air and may exert minimal amounts of force on tether 204.

Figure 2B:
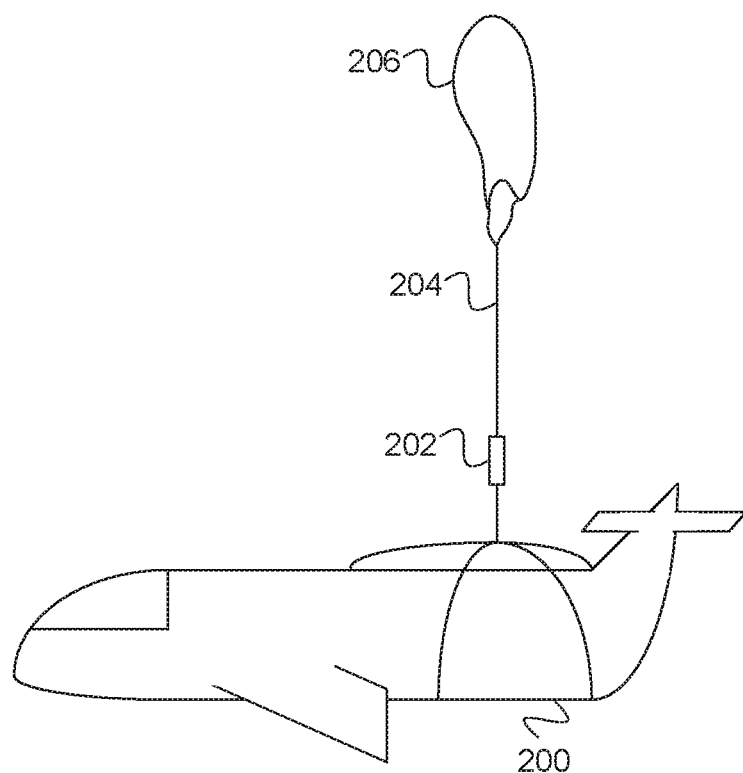
FIG. 2B is a diagram illustrating an embodiment of an aircraft comprising a load limiting device of a bimodal parachute deployment system after the load limiting device is triggered.

FIG. 2B is a diagram illustrating an embodiment of a load limiting device of a bimodal parachute deployment system after the load limiting device is triggered. In the example shown shock absorber 202 has expanded in length from its original length as shown in FIG. 2A. Parachute 206 has filled with air, causing the parachute to exert an upwards force on tether 204. In some embodiments, as parachute 206 fills with air, the upwards force exerted on shock absorber 202 causes the shock absorber to expand vertically. Shock absorber 202's expansion may alieve an initial load experienced by parachute 206, preventing parachute 206 from ripping due to sudden load as it inflates. A shock absorber may be used when a parachute is deployed from an aircraft traveling at a high altitude or high speed. The presence of the shock absorber may be ideal for recovering the aircraft in certain conditions whereas the absence of the shock absorber is desired in other conditions.

Figure 3A:
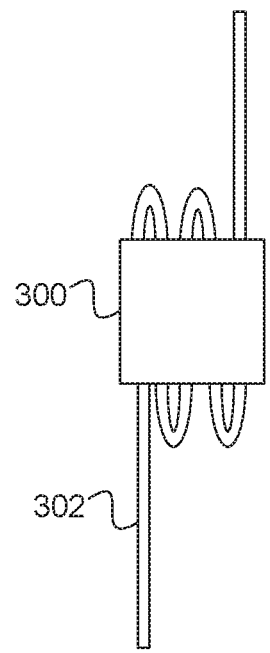
FIG. 3A is a diagram illustrating an embodiment of a load limiting device of a bimodal parachute deployment system.

FIG. 3A is a diagram illustrating an embodiment of a load limiting device of a bimodal parachute deployment system. A shock absorber is shown. The shock absorber comprises tether 302 and fastener 300. Tether 302 is folded and secured with fastener 200, decreasing the length of the tether. In some embodiments, tether 302 is attached to a parachute at the top of the tether or attached to an aircraft at the bottom of the tether.

Figure 3B:
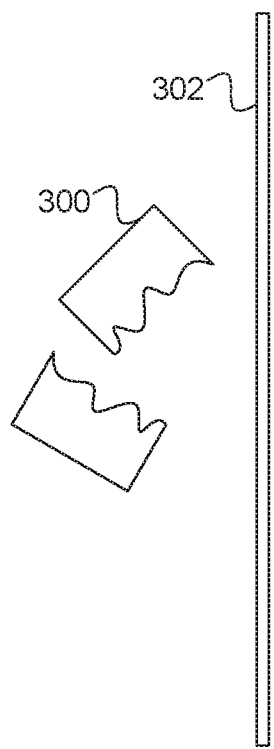
FIG. 3B is a diagram illustrating an embodiment of a load limiting device of a bimodal parachute deployment system after the load limiting device is triggered.

FIG. 3B is a diagram illustrating an embodiment of a load limiting device of a bimodal parachute deployment system after the load limiting device is triggered. The load limiting device shown is a shock absorber. In the example shown, fastener 300 has split open. Tether 302 is released to its full length. In some embodiments, fastener 300 is configured to break open when a force exerted on tether 302 reaches a predetermined threshold. The fastener may break based on an amount of force exerted in a vertical direction on tether 302. As the fastener breaks and the tether extends to its full length, load or shock delivered to an object attached to the topmost end of tether 302 may be decreased. In various embodiments, shock absorbers of various configurations may be used. The shock absorber may be made of synthetic, cloth-like, or rope-like material. The shock absorber may be inserted between sections of parachute tether in order to decrease load to a parachute. Multiple shock absorbers may be placed at different points on a parachute's tethers.

Figure 4A:
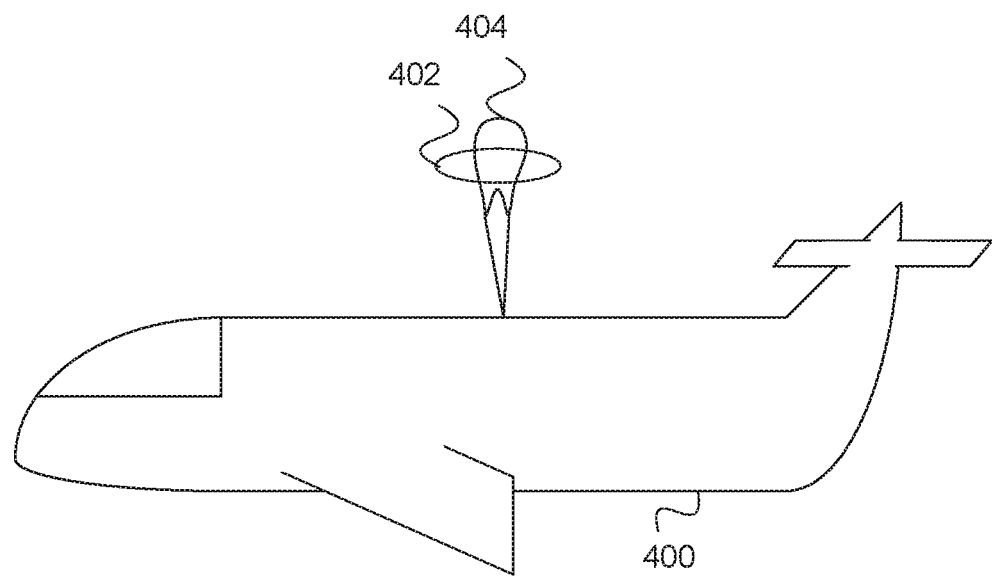
FIG. 4A is a diagram illustrating an embodiment of an aircraft comprising a reefing device of a bimodal parachute deployment system in initial stages of deployment.

FIG. 4A is a diagram illustrating an embodiment of an aircraft comprising a reefing device of a bimodal parachute deployment system in initial stages of deployment. The reefing device may be used as a load limiting device for the parachute. In the example shown, parachute 404 has been deployed from aircraft 400. The reefing device may be hollow and elliptical in shape. In the example shown, reefing device 402 is situated around parachute 404, constraining the size of the parachute. The initial volume of parachute 404 upon deployment may be determined by the size of reefing device 402. The reefing device may protect the parachute from ripping. For example, a parachute may split open upon initial deployment in the event air rushing into the parachute is too powerful for fabric of the parachute to handle. Large, thin parachutes may be ideal for low altitudes and low speeds but be susceptible to breakage. A reefing device may allow a large, thin parachute to be adaptable to high altitudes and high speeds. A reefing device may be composed of plastic, metal, composites, or any other appropriate material.

Figure 4B:
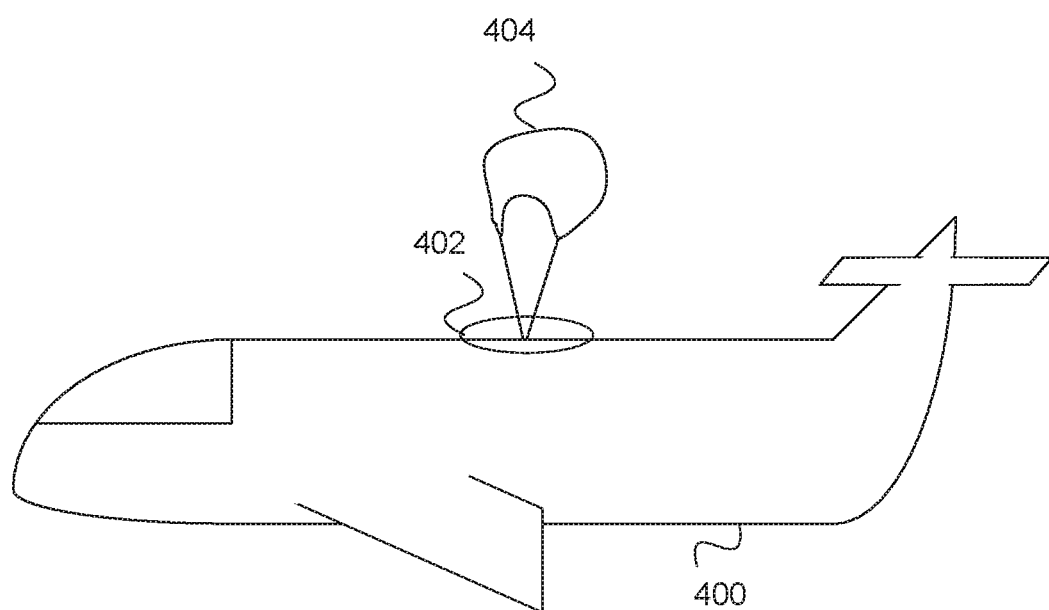
FIG. 4B is a diagram illustrating an embodiment of an aircraft comprising a reefing device of a bimodal parachute deployment system after the parachute is fully deployed.

FIG. 4B is a diagram illustrating an embodiment of an aircraft comprising a reefing device of a bimodal parachute deployment system after the parachute is fully deployed. In the example shown, parachute 404 is fully inflated and is attached to aircraft 400. Reefing device 402 is situated at a base of parachute 404. Reefing device 402 may restrict a size of an opening at the bottom of parachute 404, causing the parachute to inflate slowly. As the parachute inflates, the reefing device may slide down the parachute.

Figure 4C:
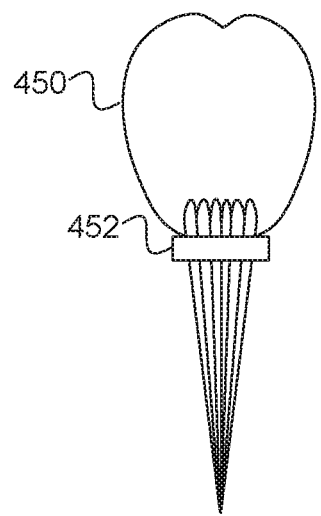
FIG. 4C is a diagram illustrating an embodiment of a reefing device.

FIG. 4C is a diagram illustrating an embodiment of a reefing device. In the example shown, parachute 450 is deployed with reefing device 452. Reefing device 452 as shown is positioned below a canopy of parachute 450. The reefing device holds tethers of the parachute close together. The reefing device prevents the canopy from inflating fully and decreases an amount of load on the parachute.

In some embodiments, a reefing device includes a line that is accessible by a severing device on the aircraft. Cutting the line may cause the reefing device to fall down or fall off. The severing device may be used to disengage the reefing device after the parachute is initially deployed with the reefing device engaged. The severing device may include a timer. The severing device may cut a component of the reefing device after a predetermined amount of time has passed since parachute deployment. In some embodiments, severing the reefing device allows a parachute to sufficiently slow down its vehicle, human, or other object before impact. The ability to engage or disengage the reefing device before or during deployment may be critical to successful recovery.

Figure 4D:
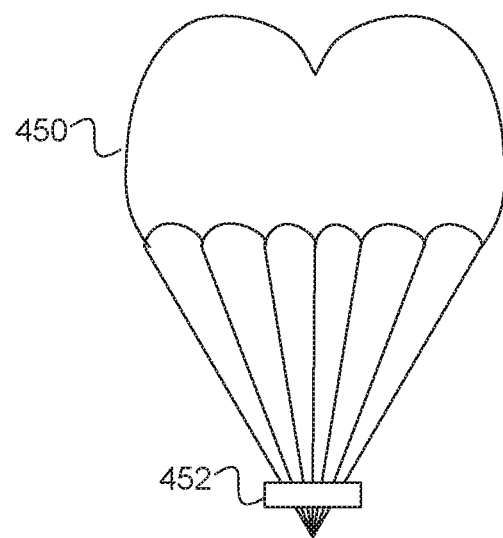
FIG. 4D is a diagram illustrating an embodiment of a reefing device.

FIG. 4D is a diagram illustrating an embodiment of a reefing device. In the example shown, reefing device 452 is at the bottom of tethers of parachute 450. In some embodiments, reefing device 452 slides down the tethers slowly as the parachute inflates with air. In some embodiments, reefing device 452 is released and falls to the bottom of the tethers based on a timer-triggered process or is disengaged by a load limiting device state controller.

Figure 5A:
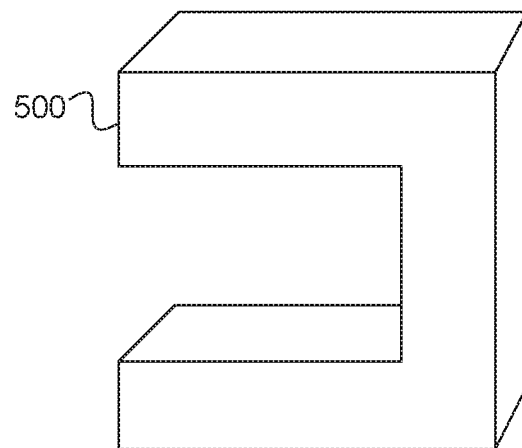
FIG. 5A is a diagram illustrating an embodiment of a severing tool of a bimodal parachute deployment system.

FIG. 5A is a diagram illustrating an embodiment of a severing tool of a bimodal parachute deployment system. The severing tool may be used as a load limiting device state controller. The severing tool may be used to cut off a load limiting device. In some embodiments, the parachute load limiting device state controller severs a component of the parachute load limiting device in order to set the parachute load limiting device to a disengaged state. For example, cutting a load limiting device off of a parachute prior to deployment prevents the load limiting device from affecting the parachute's deployment. The load limiting device state controller may perform an action that permanently affects the load limiting device. For example, cutting a component of the load limiting device may prevent the device from ever being used effectively. In some embodiments, the load limiting device state controller performs an action on the load limiting device to enable or disable it that can be reversed.

In the example shown, severing tool 500 is a U-shape. In some embodiments, a load limiting device state controller comprises a blade. The blade may be stored within the tool. In the event the severing tool is triggered, the blade may extrude and cut an object placed inside the severing tool. The blade may be retractable. The severing tool may be configured to surround an object that is required to be severed. The severing tool may be used or not used based on conditions prior to parachute deployment.

Figure 5B:
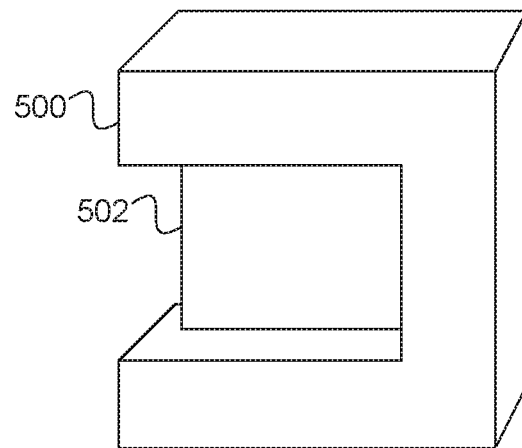
FIG. 5B is a diagram illustrating an embodiment of a severing tool of a bimodal parachute deployment system.

FIG. 5B is a diagram illustrating an embodiment of a severing tool of a bimodal parachute deployment system. In the example shown, severing tool 500 comprises blade 502. Blade 502 may cut through an object placed within the severing tool. The shape of the severing tool may prevent the blade from being exposed to objects besides an intended object. For example, the left side of blade 502 as shown may be blunt whereas the bottom edge of the blade is sharp.

In various embodiments, various configurations of severing tools may be used. The blade may be exposed or the tool may be rectangular in shape. The tool may comprise an exposed blade that is attached to a frame of an aircraft. The blade may be originally positioned downward in a position wherein it is able to cut a desired object. The blade may be automatically shifted upwards to a position where it cannot encounter the desired object in the event the severing tool is not to be used. The severing tool may comprise an explosive. The tool may vary in size and may be attached to the aircraft in various locations.

Figure 6A:
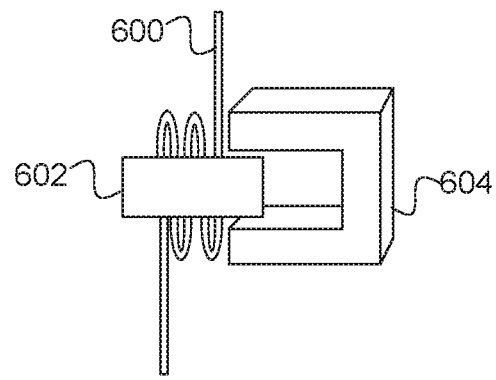
FIG. 6A is a diagram illustrating an embodiment of a load limiting device and severing tool of a bimodal parachute deployment system prior to deployment.

FIG. 6A is a diagram illustrating an embodiment of a load limiting device and severing tool of a bimodal parachute deployment system prior to deployment. A parachute load limiting device state controller may set a parachute load limiting device to one of two states. The two states may comprise an engaged state wherein the parachute load limiting device is utilized and a disengaged state wherein the parachute load limiting device is not utilized. The parachute load limiting device state controller may set the parachute load limiting device to an engaged state in the event an object of interest is determined to be at a high altitude or a high speed. The parachute load limiting device state controller may set the parachute load limiting device to a disengaged state in the event an object of interest is determined to be at a low altitude or a low speed.

The parachute load limiting device may be engaged as a default state. In the example shown, severing tool 604 surrounds fastener 602. Fastener 602 holds tether 600 in a bundled configuration as a shock absorber. In some embodiments, the parachute load limiting device state controller does not perform an action in the event the parachute load limiting device is to be set to an engaged state. A blade of severing tool 604 may remain retracted in the event the parachute is desired to be deployed with the shock absorber intact. A parachute attached to tether 600 may be deployed with the shock absorber.

Figure 6B:
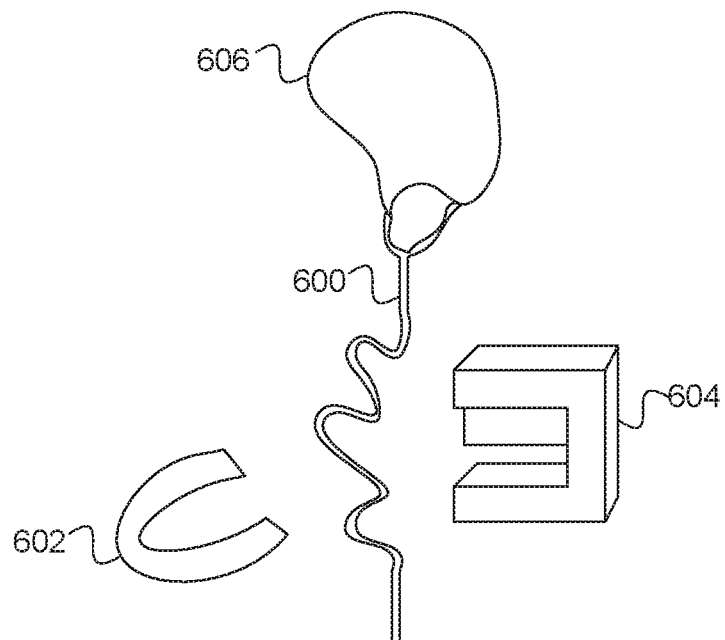
FIG. 6B is a diagram illustrating an embodiment of a load limiting device and severing tool of a bimodal parachute deployment system wherein the severing tool is triggered.

FIG. 6B is a diagram illustrating an embodiment of a load limiting device and severing tool of a bimodal parachute deployment system wherein the severing tool is triggered. In some embodiments, the parachute load limiting device state controller severs a component of the parachute load limiting device in the event the parachute load limiting device state controller sets the parachute load limiting device to a disengaged state. In the example shown, a blade of severing tool 604 is brought down to cut off fastener 602. The shock absorber on the tether of the parachute is released. Fastener 602 is detached from tether 600, allowing the tether to reach its full length. Tether 600 is attached to parachute 606.

In some embodiments, a parachute load limiting device state controller is controlled automatically based on the sensor information. For example, severing tool 604 may be triggered to cut fastener 602 in the event a speed of the aircraft falls below a predetermined threshold. The parachute load limiting device state controller may comprise a mechanical switch or electronic components. A flight computer may analyze signals received from sensors and send a command to the load limiting device state controller. The process may be handled automatically due to slow human reaction times.

In some embodiments, the parachute load limiting state controller is controlled by a pilot or other human. A pilot of an aircraft may use the bimodal parachute deployment system to modify parachutes based on recovery conditions. For example, a pilot may press a button, pull a level, or otherwise send a command that controls the severing tool.

Figure 6C:
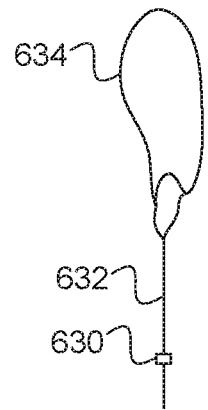
FIG. 6C is a diagram illustrating an embodiment of a load limiting device of a bimodal parachute deployment system wherein a severing tool is not triggered.

FIG. 6C is a diagram illustrating an embodiment of a load limiting device of a bimodal parachute deployment system wherein a severing tool is not triggered. In the event that the parachute is determined to be deployed with the load limiting device engaged, the severing tool may not cut off a shock absorber. In the example shown, parachute 634 is deployed with shock absorber 630 on parachute tether 632.

Figure 7A:
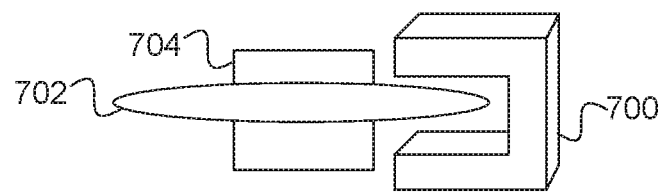
FIG. 7A is a diagram illustrating an embodiment of a reefing device and severing tool of a bimodal parachute deployment system prior to deployment.

FIG. 7A is a diagram illustrating an embodiment of a reefing device and severing tool of a bimodal parachute deployment system prior to deployment. In the example shown, severing tool 700 surrounds a portion of reefing device 702. Reefing device 702 may be cylindrical or ring-like. Reefing device 702 surrounds parachute container 704. In some embodiments, a reefing device may be stored inside of a parachute container. A severing tool may be configured to have access to the reefing device prior to parachute deployment, regardless of where the reefing device is stored.

Figure 7B:
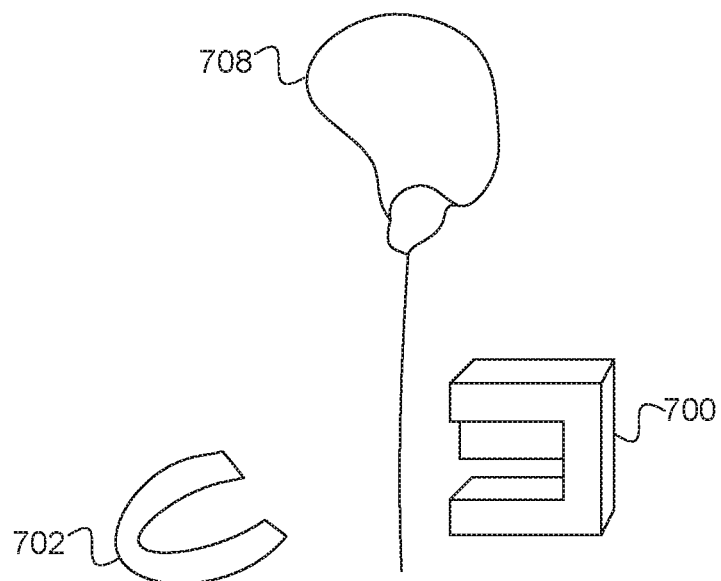
FIG. 7B is a diagram illustrating an embodiment of a reefing device and severing tool of a bimodal parachute deployment system wherein the severing tool is triggered.

FIG. 7B is a diagram illustrating an embodiment of a reefing device and severing tool of a bimodal parachute deployment system wherein the severing tool is triggered. In some embodiments, the parachute load limiting device state controller cuts a reefing device from a parachute prior to parachute deployment. In the example shown, reefing device 702 has been severed. Severing tool 700 has its blade exposed. A blade of a severing tool may retract after being used to cut an object. Parachute 708 is fully filled with air.

Figure 7C:
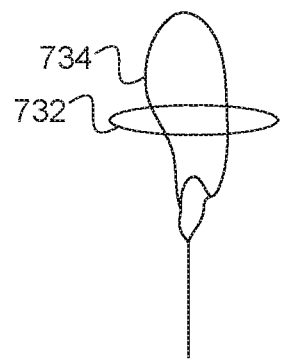
FIG. 7C is a diagram illustrating an embodiment of a reefing device of a bimodal parachute deployment system wherein a severing tool is not triggered.

FIG. 7C is a diagram illustrating an embodiment of a reefing device of a bimodal parachute deployment system wherein a severing tool is not triggered. In the event the severing tool does not cut off the reefing device, the parachute deploys with the reefing device. As shown, parachute 734 is partially filled with air. It is constrained by reefing device 732, which surrounds it. The severing tool may not cut off the reefing device due to environmental or flight conditions.

In some embodiments, two or more parachute load limiting devices are used as part of a bimodal parachute deployment system. Two or more parachute load limiting device state controllers may be used. A parachute load limiting device may be paired with a parachute load limiting device state controller. The system may include a load limiting device state controller that is controlled automatically and another load limiting device state controller that is controlled by a human.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A parachute deployment system for deploying a parachute, comprising:
   an interface configured to receive sensor information;
   a parachute load limiting device including a reefing device; and
   a parachute load limiting device state controller configured to set a state of the parachute load limiting device to a state associated with a corresponding amount of load based at least in part on the sensor information including causing the reefing device to be situated around a mid-section of a canopy of the parachute to constrain a size of the parachute in an initial state, wherein the reefing device is configured to slide down the canopy to a bottom of the parachute to hold tethers of the parachute together.

2. The system of claim 1, wherein the reefing device is configured to hold tethers of an aircraft close together.

3. The system of claim 1, wherein the parachute load limiting device state controller comprises a severing tool configured to control a state of the parachute load limiting device.

4. The system of claim 1, wherein the parachute load limiting device state controller comprises a blade.

5. The system of claim 1, comprising one or more additional parachute load limiting devices or one or more additional parachute load limiting device state controllers.

6. The system of claim 1, wherein the sensor information comprises environmental factors, obstacles, wind speed, altitude, or velocity.

7. The system of claim 1, wherein the parachute load limiting device comprises a set of possible states.

8. The system of claim 7, wherein the set of possible states comprises an engaged state wherein the parachute load limiting device is utilized and a disengaged state wherein the parachute load limiting device is not utilized.

9. The system of claim 1, wherein the parachute load limiting device is engaged as a default state.

10. The system of claim 1, wherein the parachute load limiting device state controller sets the parachute load limiting device to an engaged state in the event a payload is determined to be at a high altitude or a high speed.

11. The system of claim 1, wherein the parachute load limiting device state controller severs a component of the parachute load limiting device in the event the parachute load limiting device state controller sets the parachute load limiting device to a disengaged state.

12. The system of claim 1, wherein the parachute load limiting device state controller engages or disengages the parachute load limiting device prior to deployment of the parachute.

13. The system of claim 1, wherein the parachute load limiting device state controller engages or disengages the parachute load limiting device after deployment of the parachute.

14. The system of claim 1, wherein the parachute load limiting device state controller releases the reefing device from the parachute prior to parachute deployment.

15. The system of claim 1, wherein the parachute load limiting device state controller releases the reefing device from the parachute after parachute deployment.

16. The system of claim 1, wherein the parachute load limiting device state controller does not perform an action in the event the parachute load limiting device is to be set to an engaged state.

17. The system of claim 1, wherein the parachute load limiting device state controller is controlled automatically based on the sensor information.

18. The system of claim 1, wherein the parachute load limiting device responds to parachute deployment by sliding to a bottom of the parachute to surround tethers of the parachute.

19. The system of claim 1, wherein in a third state the parachute load limiting device surrounds a bottom portion of tethers of the parachute and the parachute load limiting device state controller disengages the parachute load limiting device to permit the parachute load limiting device to transition from a second state to a third state.

20. The system of claim 1, wherein the parachute load limiting device includes a severing tool to separate a component of the parachute load limiting device to disengage the parachute load limiting device.

21. The system of claim 1, wherein the parachute load limiting device includes a severing tool configured to disengage the parachute load limiting device prior to deployment.

22. The system of claim 1, wherein the parachute load limiting device includes a severing tool configured to surround a portion of the parachute load limiting device and to cut off the parachute load limiting device.

23. The system of claim 1, wherein the parachute load limiting device state controller sets the parachute load limiting device to a disengaged state in the event a payload is determined to be at a low altitude or a low speed.

24. The system of claim 23, wherein the parachute load limiting device state controller performs actions based on a timer.

\* \* \* \* \*